US009754200B2

(12) United States Patent
Marinkin et al.

(10) Patent No.: US 9,754,200 B2
(45) Date of Patent: Sep. 5, 2017

(54) METHOD FOR PROTECTING THE AUTHENTICITY OF AN ARTICLE FROM IMITATION AND COUNTERFEIT

(71) Applicants: Dmitri Marinkin, Harju maakond (EE); Aleksandr Volohhonski, Harju maakond (EE)

(72) Inventors: Dmitri Marinkin, Harju maakond (EE); Aleksandr Volohhonski, Harju maakond (EE)

(*) Notice: Subject to any disclaimer, the term of this patent is extended or adjusted under 35 U.S.C. 154(b) by 63 days.

(21) Appl. No.: 14/449,920

(22) Filed: Aug. 1, 2014

(65) Prior Publication Data
US 2015/0151560 A1    Jun. 4, 2015

(30) Foreign Application Priority Data
Nov. 29, 2013   (EE) ............... 201300094 U

(51) Int. Cl.
G06K 19/06 (2006.01)
G09F 3/00 (2006.01)
G07D 7/004 (2016.01)
G07D 7/0047 (2016.01)

(52) U.S. Cl.
CPC ....... *G06K 19/06037* (2013.01); *G07D 7/004* (2013.01); *G07D 7/0047* (2017.05); *G09F 3/0292* (2013.01)

(58) Field of Classification Search
CPC ................ G06K 10/0083; G06K 2017/0064
USPC ........................................ 235/494, 375, 385
See application file for complete search history.

(56) References Cited

U.S. PATENT DOCUMENTS

| 9,092,651 B2* | 7/2015 | Ching | |
| 2007/0040014 A1* | 2/2007 | Zhao | G07D 11/0066 235/379 |
| 2009/0284802 A1* | 11/2009 | Yeap et al. | 358/3.28 |
| 2010/0294834 A1* | 11/2010 | Wong | G07D 11/0057 235/379 |
| 2013/0282601 A1* | 10/2013 | Pieri | 705/318 |
| 2014/0263615 A1* | 9/2014 | Deangelo | G07D 7/0026 235/375 |
| 2014/0324716 A1* | 10/2014 | Florencio et al. | 705/318 |

FOREIGN PATENT DOCUMENTS

| RU | 2202127 C2 | 4/2003 |
| RU | 2285954 C1 | 8/2006 |

* cited by examiner

*Primary Examiner* — Daniel St Cyr
(74) *Attorney, Agent, or Firm* — Robert R. Michael, Esq.; Carter, DeLuca, Farrell & Schmidt, LLP

(57) ABSTRACT

The method for protecting the authenticity of an article from imitation and counterfeit is characterized by the following. During the packaging process, a container label is affixed to the article, which container label comprises a national bank note having a serial number which is encoded with the aid of a cryptographic algorithm and is shown on the outer surface of the label as a verification code, which is decoded with the aid of cryptographic keys. The verification code is represented in the form of alphanumeric information or in the form of a two-dimensional QR barcode, wherein more than one verification code can be shown on the outer surface of the label.

7 Claims, 3 Drawing Sheets

METHOD FOR PROTECTING THE AUTHENTICITY OF AN ARTICLE FROM IMITATION AND COUNTERFEIT

CROSS-REFERENCE TO RELATED APPLICATION

The present Application claims priority under 35 U.S.C. 119 to EE 201300094, filed Nov. 29, 2013, the entire disclosure of which is incorporated herein by reference.

BACKGROUND

1. Technical Field

The invention relates to methods for protecting goods from counterfeit, i.e., to methods for identifying a counterfeit, and can be used by manufacturers for protecting goods manufactured by them and also for protecting consumers from purchasing goods manufactured by illegal manufacturers (counterfeit goods).

2. Background of the Related Art

At present, methods are known for protecting the authenticity of articles from counterfeit. A method for identifying a counterfeit (RU patent No. 2202127 C2) has the technical result of increasing the level of protection from imitation of a product with the aid of the use of an internal random structural pattern of a carrier material as an identified tag. The proposed invention recommends selecting a material with a distinct random structure design as a label and selecting a random structural design of the label as information for identification, which is read by a scanner and then stored in the database of a computer identification system. Consumers can receive corresponding information relating to the structural pattern by telephone, by fax or over the Internet, confirming the authenticity or counterfeit nature of a product.

The disadvantages of this method are as follows: (1) the difficulty and impossibility of simplifying the process for verifying the identification of a counterfeit; and (2) the low level of accuracy and unreliability of results of the comparison procedure.

The method for protecting goods from counterfeit (RU patent No. 2285954 C1) is characterized by the fact that the authenticity of goods is established by comparing a digitized image of an identifier with which the goods are provided and which is in the form of a three-dimensional physical body which comprises randomly distributed optically visible elements with a digitized image of an identifier stored in an electronic database.

A dedicated feature, for example a registration number which is used to determine precisely which digital image from the plurality of digital images stored in the electronic database needs to be compared with the digital image of the identifier being verified, is assigned to each identifier.

The authenticity of the goods is established with the involvement of a specialized organization which verifies the rights of the manufacturer and confirms the authenticity of the information presented to the consumer.

The digital image of the identifier which is used for the comparison with the image stored in the database is obtained with the aid of a device in which the functions of the acquisition of a digital image and the reception/transmission of data remotely are combined, wherein the device is a mobile telephone with a built-in digital camera.

The disadvantages of this method are as follows: (1) the comparatively low level of reliability of the results of the comparison procedure since, if a digitized code on an identifier is copied and an image of the original identifier is attached, the verification will confirm that the digitized code is present in the database and that the image of the identifier corresponds to the original; (2) the difficulty involved in the processing and maintenance of the database of scanned copies of samples which over time, will increase constantly; (3) the impossibility of verifying the goods when there is no connection to the database.

BRIEF DESCRIPTION OF THE DRAWINGS

Various embodiments of the subject instrument are described herein with reference to the drawings wherein.

DETAILED DESCRIPTION

Particular embodiments of the present disclosure are described herein below with reference to the accompanying drawings. In the following description, well-known functions or constructions are not described in detail to avoid obscuring the present disclosure in unnecessary detail.

It is to be understood that the disclosed embodiments are merely exemplary of the disclosure, which can be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure. Further, the terms and phrases used herein are not intended to be limiting; but rather, to provide an understandable description of the disclosure.

Figure 1:
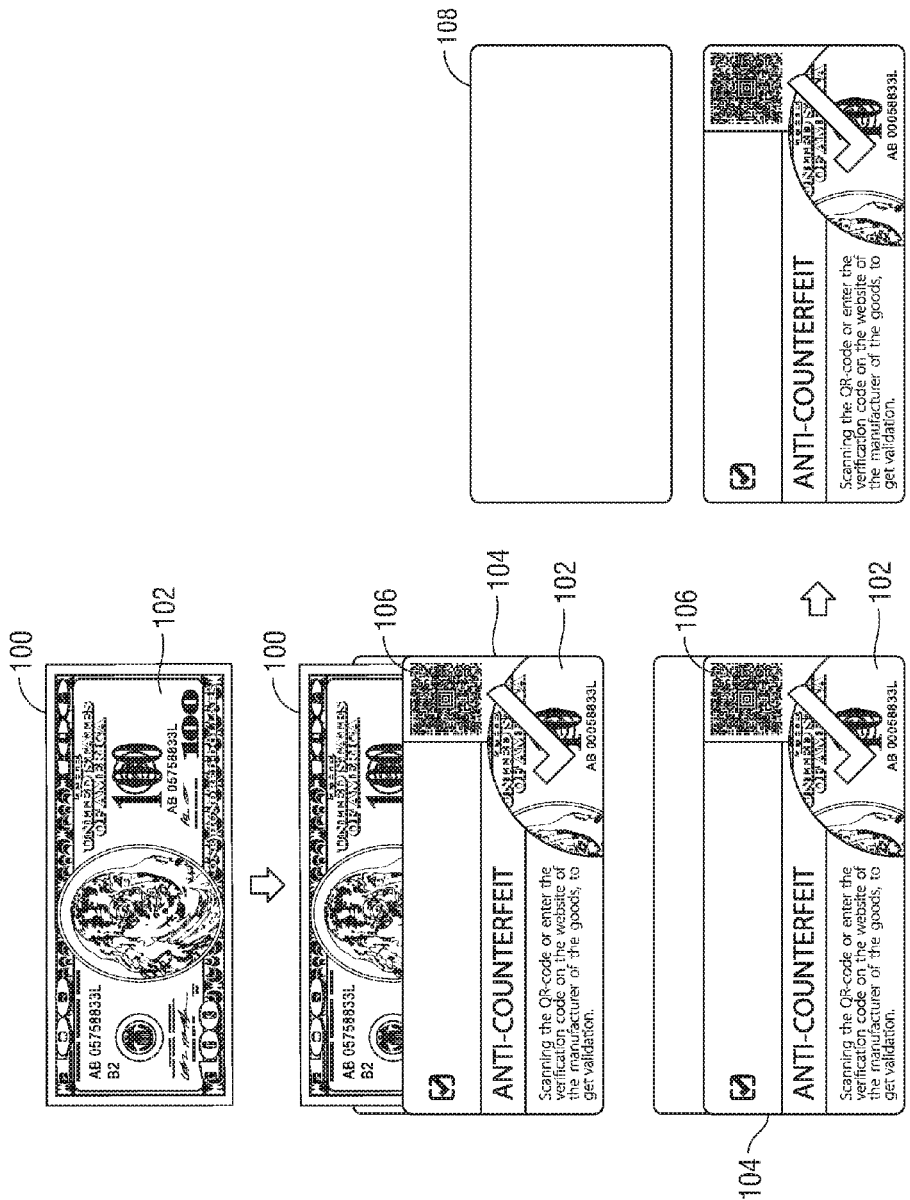
FIG. 1 is an illustration of a product package label-container of the present disclosure.

The object of the present invention consists in increasing the level of reliability and simplifying the process of verifying the authenticity of an article. In order to achieve this object, a method is proposed for protecting the authenticity of an article from imitation and counterfeit which is characterized as follows:

Referring now to FIG. 1, a packaging process is illustrated. During the packaging process, a label-container 104 is affixed to the article (FIG. 2), which label-container 104 comprises a national bank note 100 having a serial number 102 which is used and encoded with the aid of a cryptographic algorithm to create verification code 106. Verification code 106 is shown on the outer surface of the label, which is decoded with the aid of cryptographic keys. As used herein a "national bank note" includes currency which contains a specific serial number 102 which is unique for each individual currency (e.g., U.S. Dollar, the euro, British Pound). It is contemplated that verification code 106 may be is represented in the form of alphanumeric information or in the form of a two-dimensional QR barcode. In other embodiments, more than one verification codes 106 may be shown on the outer surface of the label.

In order to protect a product from imitation and counterfeit, using a cryptographic algorithm with a public key in accordance with an asymmetric encryption method, a private key and a public key are produced. For each serial number 102 of national bank note 100, a verification code 106 is produced with the aid of the private key using the above-described cryptographic algorithm. National bank note 100 is packaged in label-container 104 and the corresponding serial number 102 of national bank note 100, i.e. verification code 106 in alphanumeric form or in the form of a two dimensional QR barcode, is shown on the outer side of the label-container 104. The label-container 104 is affixed to the article via the adhesive-layer 108 so as to make it impossible for label-container 104 to be used illegally without destroying the integrity of label-container 104 the packaging of the article and national bank note 100.

Figure 2:
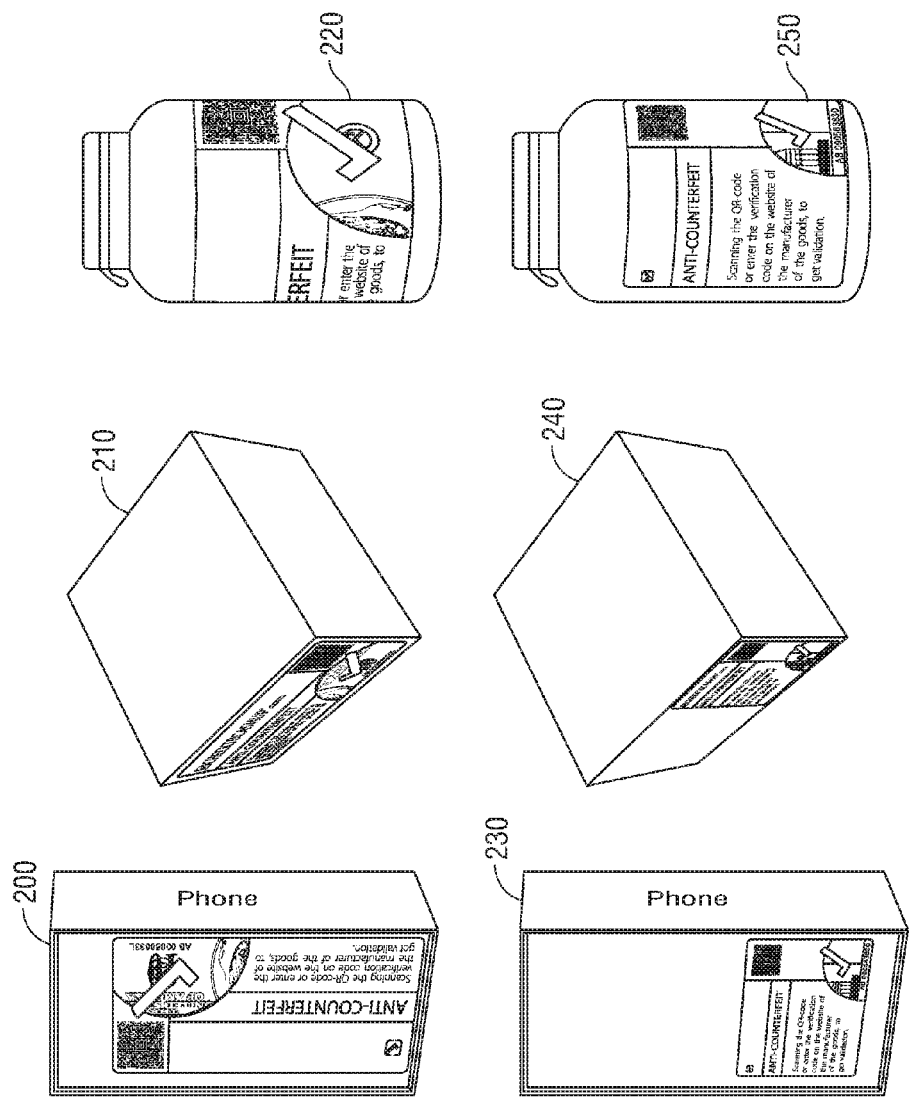
FIG. 2 is an illustration of the product package label-container in use.

Referring now to FIG. 2, various articles are illustrated with label-container 104 affixed. Phone containers 200 and 230, boxes 210 and 240, and pill bottles 220 and 250 each display label-container 104 with national bank note 100 inserted.

Figure 3:
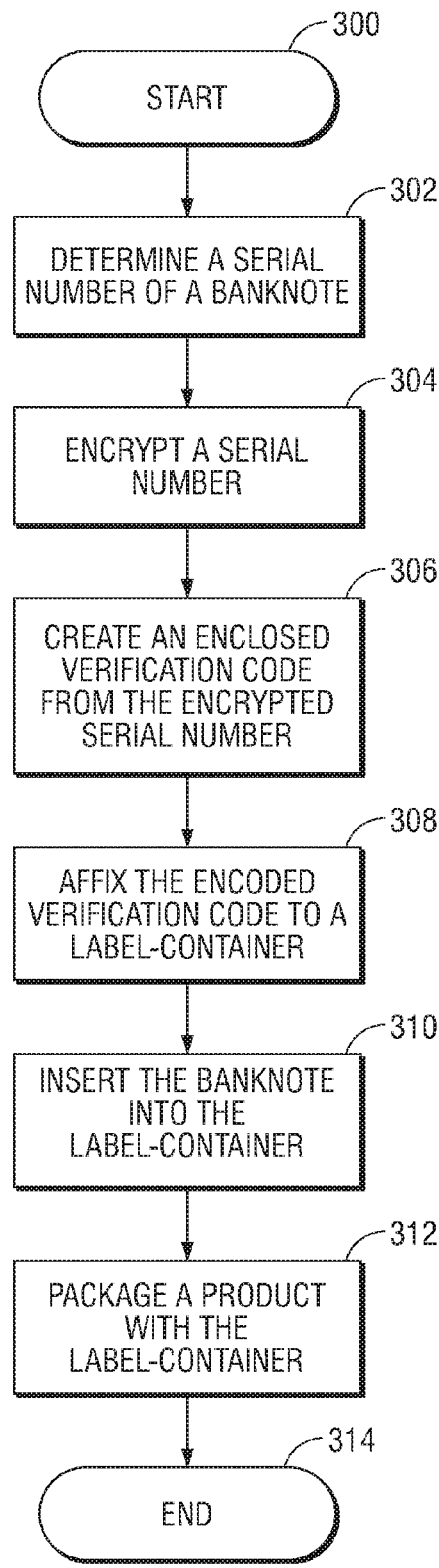
FIG. 3 is a flowchart detailing a method of using the product package label-container.

FIG. 3 illustrates a flowchart detailing a method of using label-container 104. At step 302, serial number 102 is determined from national bank 100 and serial number 102 is then encrypted at step 304. From the encrypted serial number, verification code 106 is created in step 306. Next, verification code 106 is affixed to label-container 104, in step 308. In step 310, national bank note 100 is inserted into label-container 104. Finally, in step 310 the article is packaged with label-container 104, containing national bank note 100 and verification code 106.

In further embodiments, on the manufacturer's website, any consumer of the article wishing to do so will be provided the possibility of manually inputting and decoding the verification code 106 on the label and comparing this code with serial number 102 of national bank note 100. A correspondence of the result of the decoding of the verification code 106 with serial number 102 of national bank note 100 from label-container 104 will indicate the authenticity of the article being verified, the absence of a national bank note 100 or the replacement of such a national bank note 100 with any other object will constitute a destruction of the integrity of label-container 104 and an indication of counterfeit of the article.

Verification of the authenticity of an article is also performed by means of scanning a two-dimensional QR barcode with the aid of any individual electronic devices in which the functions of the acquisition of a digital image and the reception/transmission of data remotely are combined; in this case the device is a mobile telephone with a built-in digital camera. In this case, on the manufacturer's website the possibility is provided of reading and decoding the verification code 106 from the two-dimensional QR barcode and comparing this verification code 106 with serial number 102 of national bank note 100.

The process of verification of the authenticity of an article can also be implemented offline with the aid of applications (programs) for individual electronic devices scanning a two-dimensional QR barcode and performing a process of decoding the verification code 106 with the aid of a public key. As part the operation of these applications (programs), it is also possible to create a special service to which consumers could send information relating to discovered cases of a counterfeit product and receive monetary compensation if the fact of counterfeit is confirmed. Furthermore, a manufacturer can receive operational information relating to a seller where a counterfeit of the manufacturer's product is sold or the use of a counterfeit national bank note 100 is discovered.

As additional protection, the value of national bank note 100 can be varied depending on the price of a unit of goods; the more expensive the article, the higher the value of national bank note 100 and as a result, the greater the degree of protection of the bank note.

Based on the aforementioned, the present disclosure provides the additional advantageous effects: (1) an increase in the reliability of protection of an article from imitation and counterfeit; (2) a simplification of the process of verification of authenticity of an article without any loss of quality of the protection; (3) the high level of protection of the article from counterfeit is ensured by cryptographic protection of the transmission of verification data; (4) enables offline verification of the authenticity of an article when there is no connection to the Internet or other forms of communication; (5) the cost of an undamaged national bank note 100 remains unchanged after the verification and is not a costly component for the manufacturer; and (6) the high level of protection of the article from counterfeit is additionally ensured by the national protection of national bank note 100.

The methods disclosed herein, including but not limited to the encryption and decryption of serial numbers, may utilize computer memory and processors, such as those included in the mobile telephones or electronic devices aforementioned herein. In an embodiment, memory may include one or more solid-state storage devices such as flash memory chips. Alternatively or in addition to the one or more solid-state storage devices, memory may include one or more mass storage devices connected to the processor through a mass storage controller and communications bus. Although the description of computer-readable media contained herein refers to a solid-state storage, it should be appreciated by those skilled in the art that computer-readable storage media can be any available media that can be accessed by the processor. That is, computer readable storage media includes non-transitory, volatile and non-volatile, removable and non-removable media implemented in any method or technology for storage of information such as computer-readable instructions, data structures, program modules or other data. For example, computer-readable storage media includes RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information and which can be accessed.

The invention claimed is:

1. A method for utilizing a bank note to authenticate a product from imitation and counterfeiting, said product being carried by a label-container, the method comprising:
   operatively coupling the bank note and the label-container;
   determining a serial number of the bank note;
   encoding the serial number of the bank note to create an encoded verification code;
   packaging the product with the label-container, wherein the bank note is located inside the label-container and the encoded verification code is located on an exterior of the label-container; and
   comparing the serial number of the bank note to the encoded verification code;
   wherein upon receipt of the label-container after shipment, if the serial number of the bank note matches the encoded verification code, the label-container and/or product are deemed to be authentic, and if the serial number of the bank note does not match the encoded verification code, the label-container and/or product are deemed to be unauthentic, and
   wherein the value of the bank note is varied depending upon the value of the product such that the greater the value of the product, the higher the value of the bank note.

2. The method of claim 1, wherein the encoded verification code is a two-dimensional QR code.

3. The method of claim 1, wherein the encoded verification code is an alphanumeric information.

4. The method of claim 1, wherein the label-container contains more than one encoded verification code.

5. The method of claim 1, wherein a cryptographic method is used to encode the serial number to create an encoded verification code.

6. The method of claim 1, further comprising decoding the encoded verification code using cryptographic keys.

7. A product packaging label-container utilizing a bank note to authenticate a product from imitation and counterfeiting, the product packaging label-container comprising:

a bank note including a serial number;

an insertable region capable of receiving the bank note and displaying the serial number once the insertable region receives the bank note; and an exterior region containing an encoded verification code, wherein the encoded verification code is created by encoding the serial number of the bank note;

wherein upon receipt of the product packaging label-container after shipment, if the serial number of the bank note matches the encoded verification code, the product packaging label-container and/or product are deemed to be authentic, and if the serial number of the bank note does not match the encoded verification code, the product packaging label-container and/or product are deemed to be unauthentic, and wherein the value of the bank note is varied depending upon the value of the product such that the greater the value of the product, the higher the value of the bank note.

* * * * *

UNITED STATES PATENT AND TRADEMARK OFFICE
CERTIFICATE OF CORRECTION

PATENT NO. : 9,754,200 B2  
APPLICATION NO. : 14/449920  
DATED : September 5, 2017  
INVENTOR(S) : Marinkin et al.

Page 1 of 1

It is certified that error appears in the above-identified patent and that said Letters Patent is hereby corrected as shown below:

On the Title Page

Column 2, item (74) Attorney, Agent, or Firm, Line 15 change "Robert R. Michael, Esq." to --Robert P. Michal, Esq.--

Signed and Sealed this  
First Day of May, 2018

Andrei Iancu  
*Director of the United States Patent and Trademark Office*